US012620052B1

(12) United States Patent
Mirhosseini et al.

(10) Patent No.: US 12,620,052 B1
(45) Date of Patent: May 5, 2026

(54) WARPING AN IMAGE WITH A COMBINATION OF WARPING FUNCTIONS

(71) Applicant: Apple Inc., Cupertino, CA (US)

(72) Inventors: Seyedkoosha Mirhosseini, Santa Clara, CA (US); Seyedpooya Mirhosseini, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 348 days.

(21) Appl. No.: 18/232,906

(22) Filed: Aug. 11, 2023

Related U.S. Application Data

(60) Provisional application No. 63/397,226, filed on Aug. 11, 2022.

(51) Int. Cl.
  *G06T 3/18* (2024.01)
  *G06T 7/60* (2017.01)
(52) U.S. Cl.
  CPC . *G06T 3/18* (2024.01); *G06T 7/60* (2013.01)
(58) Field of Classification Search
  CPC ........ G06F 3/011; G06F 3/013; G06F 3/0346; G06F 3/04842; G06F 3/012; G06F 3/04845; G06T 19/006; G06T 2207/10016; G06T 7/70; G06T 19/20; G06T 7/20; G06T 2207/10024; G06T 2207/30244; G06T 17/00; G06T 15/20; G06T 3/40; G06T 2207/20221; G06T 19/00; G06T 5/80; G06T 19/003; G06T 2200/04; G06T 2219/2016; G06T 15/04; G06T 7/194; G06T 1/20; G06T 3/18;

G06T 11/001; G06T 15/00; G06T 2200/08; G06T 2219/2021; G06T 2215/16; G06T 15/10; G06T 3/20; G06T 11/006; G06T 2207/20104; G06T 3/4007; G06T 1/00; G06T 2207/20092; G06T 2200/28; G06T 9/004; G06T 2207/20004; G02B 27/017; G02B 2027/014; G02B 27/0093; G02B 2027/0138; A63F 13/428; A63F 13/25; A63F 2300/8082
See application file for complete search history.

(56) References Cited

U.S. PATENT DOCUMENTS

| | | | |
|---|---|---|---|
| 2015/0029218 A1* | 1/2015 | Williams | ........... G02B 27/0172 |
| | | | 345/633 |
| 2020/0225473 A1* | 7/2020 | Selan | ....................... G06F 3/017 |
| 2024/0029363 A1* | 1/2024 | Banerjee | ................... G06T 5/50 |

* cited by examiner

*Primary Examiner* — Xiao M Wu
*Assistant Examiner* — Scott E Sonners
(74) *Attorney, Agent, or Firm* — Fernando & Partners, LLP

(57) ABSTRACT

A method includes obtaining an image that includes a plurality of pixels. The method includes identifying a first subset of the plurality of pixels that defines a particular geometry that a user of the electronic device is currently focusing on. The method includes warping the first subset of the plurality of pixels according to a first warping function that is based on a movement of the electronic device. The method includes warping a second subset of the plurality of pixels, that is different from the first subset, according to a second warping function that is different from the first warping function.

20 Claims, 5 Drawing Sheets

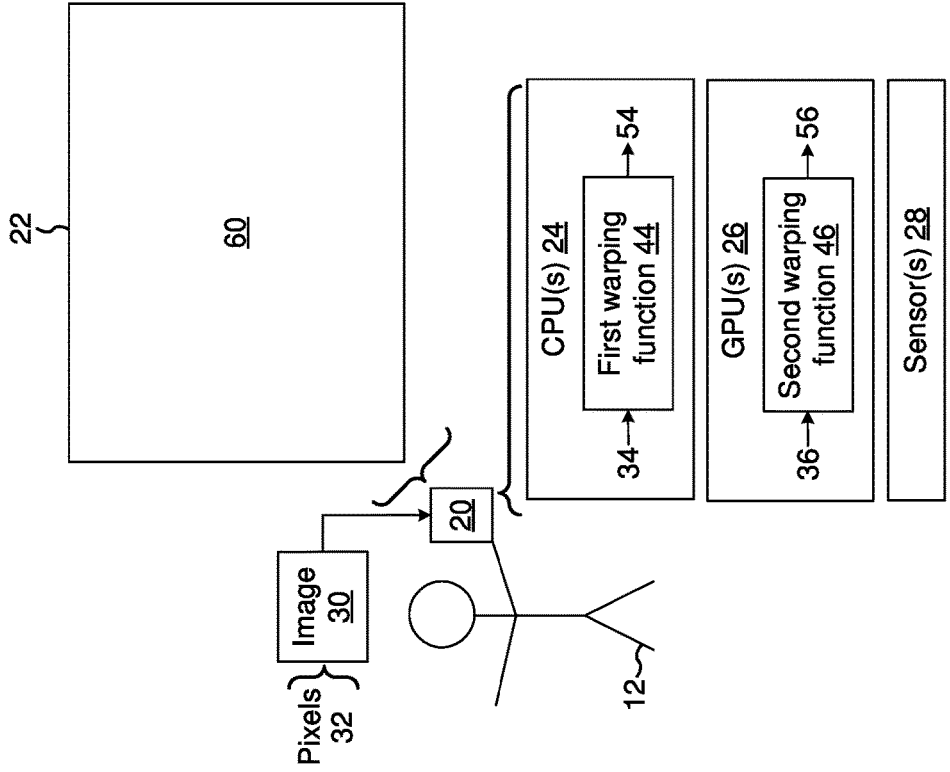
Figure 1A

Figure 3:
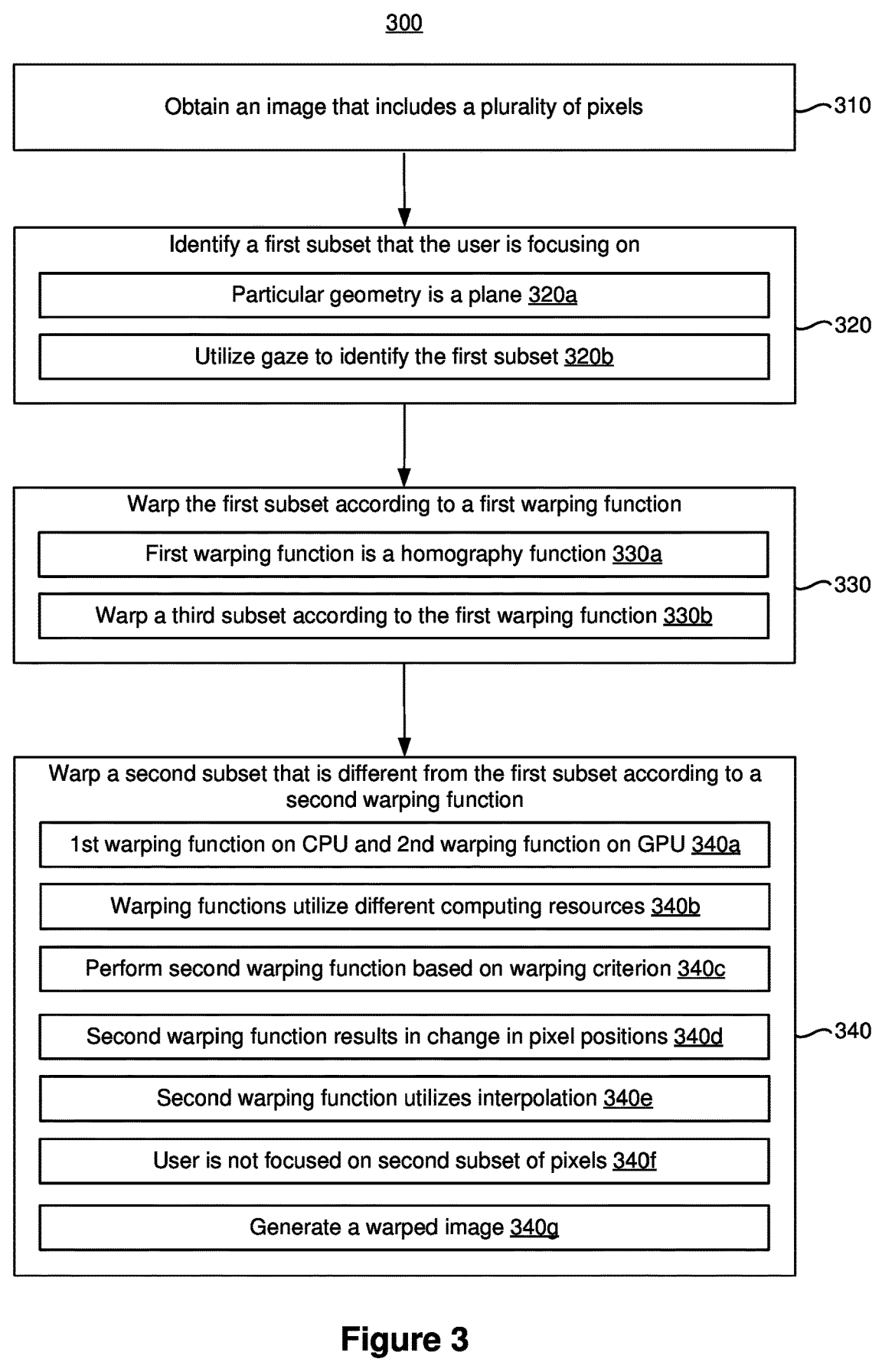

300

Obtain an image that includes a plurality of pixels ⌐~310

↓

Identify a first subset that the user is focusing on

Particular geometry is a plane 320a

Utilize gaze to identify the first subset 320b

⌐~320

↓

Warp the first subset according to a first warping function

First warping function is a homography function 330a

Warp a third subset according to the first warping function 330b

⌐~330

↓

Warp a second subset that is different from the first subset according to a second warping function 1st warping function on CPU and 2nd warping function on GPU 340a Warping functions utilize different computing resources 340b Perform second warping function based on warping criterion 340c Second warping function results in change in pixel positions 340d Second warping function utilizes interpolation 340e User is not focused on second subset of pixels 340f Generate a warped image 340g

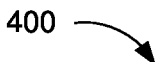
400
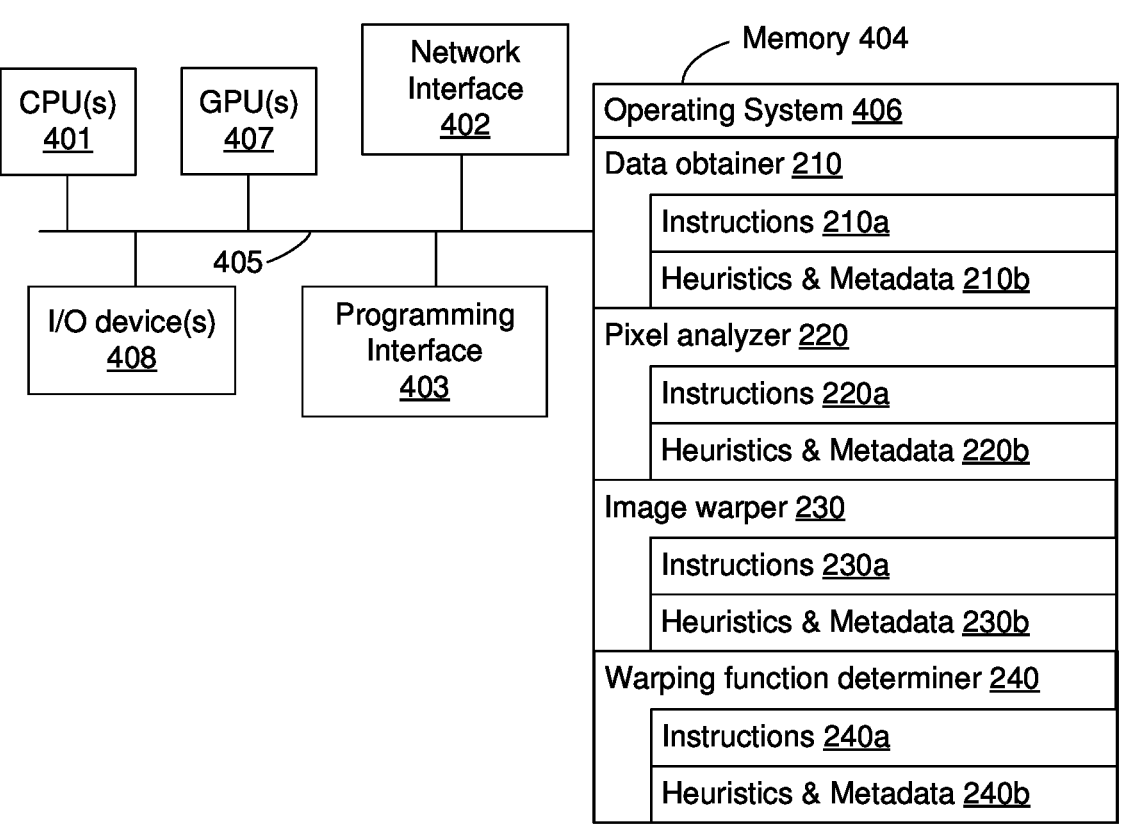
Figure 4

WARPING AN IMAGE WITH A COMBINATION OF WARPING FUNCTIONS

CROSS-REFERENCE TO RELATED APPLICATION

This application claims the benefit of U.S. Provisional Patent App. No. 63/397,226, filed on Aug. 11, 2022, which is incorporated by reference in its entirety.

TECHNICAL FIELD

The present disclosure generally relates to warping an image with a combination of warping functions.

BACKGROUND

Some devices include an integrated camera and a display. The camera captures an image of a physical environment, and the display displays the image for a user to view. As the device moves, the device can warp the image to synthesize and present a view from a new point-of-view. Warping the image provides an appearance that information presented on the display is responsive to motion of the device. However, warping the image can be a resource-intensive operation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1A is a diagram of an example operating environment in accordance with some implementations.

FIG. 3 is a flowchart representation of a method of warping an image in accordance with some implementations.

FIG. 4 is a block diagram of a device that warps an image in accordance with some implementations.

Figure 1B:
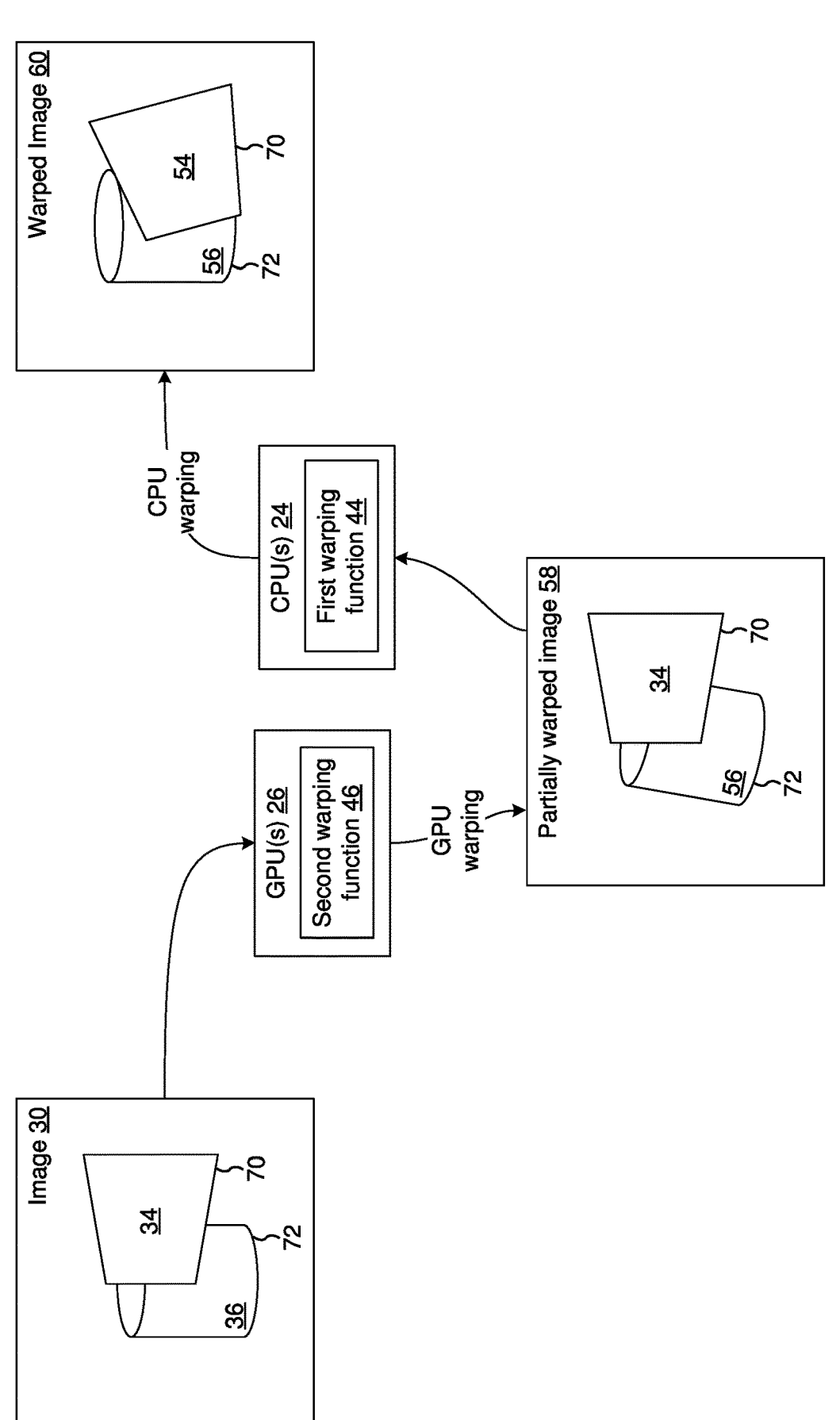
FIG. 1B is a diagram of an example image being warped in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for warping an image. In some implementations, an electronic device includes one or more processors, a non-transitory memory and an image sensor. In various implementations, a method includes obtaining an image that includes a plurality of pixels. In some implementations, the method includes identifying a first subset of the plurality of pixels that defines a particular geometry that a user of the electronic device is currently focusing on. In some implementations, the method includes warping the first subset of the plurality of pixels according to a first warping function that is based on a movement of the electronic device. In some implementations, the method includes warping a second subset of the plurality of pixels, that is different from the first subset, according to a second warping function that is different from the first warping function.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices include an integrated camera and a display. The camera captures an image of a physical environment, and the display displays the image for a user to view. As the device moves, the device can reproject the image to synthesize a view from a new point-of-view and display a warped image on the display. Reprojecting the image provides an appearance that the information presented on the display is responsive to motion of the device. Reprojection includes, for each pixel in a composited texture, identifying a corresponding position in a source texture. Sometimes there is no corresponding position in the source texture. When there is no corresponding position in the source texture, the device uses an interpolation function that relies on values from neighboring pixels. However, using the interpolation function introduces artifacts and has an adverse impact on image quality. Some interpolation functions reduce the adverse impact on quality but are resource-intensive. Additionally, performing the entire reprojection in a graphical processing unit (GPU) is resource-intensive. Using resource-intensive interpolation functions and/or performing the entire reprojection in the GPU can drain a battery of the device faster and may also result in excessive heat generation by the device.

The present disclosure provides methods, systems and/or devices for warping an image using a combination of warping functions. After obtaining an image with a set of pixels, the device identifies a subset of the pixels that corresponds to a plane that the user is focusing on. After identifying the subset of pixels, the device performs reprojection in a manner that avoids using an interpolation function on the subset of pixels that correspond to the plane that the user is focusing on. By avoiding the use of an interpolation function on the portion of the image that the user is currently focusing on, the device reduces or eliminates resampling loss in that portion of the image. As such, that particular portion of the image does not include resampling artifacts. The device can use gaze to identify the subset of pixels that the user is currently focusing on.

The device splits a warp matrix into two matrices in order to ensure that pixels corresponding to the plane stay in the same position. The first matrix may represent an inverse homography function of a subset of the pixels corresponding to the plane. The second matrix may represent an inverse of the first matrix. The two matrices are provided to a display pipeline. The display pipeline uses homography to perform the reprojection. Since pixels corresponding to the plane stay in the same position, there is no need to use an interpolation function for pixels corresponding to the plane. Forgoing the usage of the interpolation function for pixels corresponding to the plane ensures that there are no resampling artifacts over the plane.

The device synthesizes the homography function for the pixels representing the plane based on device movement (e.g., camera movement). The homography function for the plane is a first degree polynomial (e.g., a linear equation). The homography function for a curved surface such as a cylindrical surface may be a second degree or a third degree polynomial. After synthesizing the homography function for the plane, the device determines an inverse (e.g., a closed form inverse) of the homography function.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In the example of FIG. 1A, the physical environment 10 includes an electronic device 20 and a user 12 of the electronic device 20.

In some implementations, the electronic device 20 includes a handheld computing device that can be held by the user 12. For example, in some implementations, the electronic device 20 includes a smartphone, a tablet, a media player, a laptop, or the like. In some implementations, the electronic device 20 includes a wearable computing device that can be worn by the user 12. For example, in some implementations, the electronic device 20 includes a head-mountable device (HMD) or an electronic watch.

In some implementations, the electronic device 20 includes a display 22, a set of one or more central processing units (CPUs) 24 (hereafter "CPU 24" for the sake of brevity), a set of one or more graphics processing units (GPUs) 26 (hereafter "GPU 26" for the sake of brevity), and a set of sensors 28 (hereafter "sensors 28" for the sake of brevity). In some implementations, the sensors 28 include an image sensor (e.g., a scene-facing camera, for example, a rear-facing camera of a smartphone or a tablet) that captures an image 30. The image 30 includes a set of pixels 32 (hereafter "pixels 32"). In some implementations, the sensors 28 include a gaze tracker that tracks a gaze of the user 12. In some implementations, the gaze tracker relies on another image sensor (e.g., a user-facing camera, for example, a front-facing camera of a smartphone or a tablet) that captures an image of an eye of the user 12 and generates a gaze vector based on the image of the eye. The gaze vector may include values that indicate a gaze position, a gaze duration and a gaze intensity. In some implementations, the sensors 28 include a movement sensor that detects a movement (e.g., a rotation and/or a translation) of the electronic device 20. In some implementations, the movement sensor includes an inertial measurement unit (IMU).

In various implementations, the electronic device 20 warps the image 30 based on a movement of the electronic device 20 in order to generate a warped image 60. The electronic device 20 displays the warped image 60 on the display 22 in order to provide an appearance that the electronic device 20 is responsive to movement of the electronic device 20. Instead of utilizing the GPU 26 to warp an entirety of the image 30, the electronic device 20 utilizes the CPU 24 or the display pipeline to warp a first portion of the image 30 and the GPU 26 to warp a second portion of the image 30. Utilizing the GPU 26 for a warping operation tends to be more resource-intensive than utilizing the CPU 24 or the display pipeline. As such, warping at least the first portion of the image 30 in the CPU 24 or the display pipeline tends to conserve resources. For example, warping at least the first portion of the image 30 in the CPU 24 or the display pipeline tends to conserve time by allowing the electronic device 20 to complete the warping operation sooner. Since operations performed by the GPU 26 may generate more heat than operations performed by the CPU 24, warping at least the first portion of the image 30 in the CPU 24 or the display pipeline and not warping the first portion of the image 30 in the GPU 26 tends to reduce an amount of heat that the electronic device 20 generates thereby making the electronic device 20 safer to use and/or prolonging safe usage of the electronic device 20 by the user 12.

In some implementations, the electronic device 20 identifies a first subset 34 of the pixels 32 that the user 12 is currently focusing on. The first subset 34 represents a two-dimensional (2D) planar surface that the user 12 may be focusing on. In some implementations, the electronic device 20 utilizes the gaze vector to identify the first subset 34. In some implementations, the gaze vector indicates a portion of the image 30 that the user 12 is currently focusing on, and the electronic device 20 identifies a 2D plane that includes the portion of the image 30 that the user 12 is currently focusing on. In some implementations, identifying the first subset 34 includes fitting a 2D plane onto a portion of the image 30 that the user 12 is currently focusing on. In some implementations, the electronic device 20 utilizes saliency values associated with the pixels 32 to identify the first subset 34. For example, the electronic device 20 can determine that the user 12 is focusing on the most salient portion of the image 30. As such, the electronic device 20 may select the first subset 34 based on the first subset 34 having saliency values that are greater than a remainder of the pixels 32 in the image 30. In various implementations, the electronic device 20 identifies a second subset 36 of the pixels 32 that the user 12 is currently not focusing on. In some implementations, the second subset 36 includes all pixels that are not in the first subset 34. In some implementations, there is some overlap between the first subset 34 and the second subset 36 (e.g., some pixels may appear in the first subset 34 and the second subset 36).

In various implementations, the electronic device 20 utilizes a display pipeline to warp the first subset 34 in accordance with a first warping function 44, and the electronic device 20 utilizes the GPU 26 to warp the second subset 36 in accordance with a second warping function 46 that is different from the first warping function 44. As shown in FIG. 1A, in some implementations, the CPU 24 determines the first warping function 44 for the first subset 34 and the display pipeline applies the first warping function 44 on the first subset 34 to generate a first result 54, and the GPU 26 performs the second warping function 46 on the second subset 36 to generate a second result 56. The electronic device 20 can combine the first result 54 and the second result 56 to generate the warped image 60.

In some implementations, the electronic device 20 synthesizes a homography function for the first subset 34 based on movement of the electronic device 20. In some implementations, the first subset 34 corresponds to (e.g., represents) planar content, and the homography function for the first subset 34 is a first degree polynomial (e.g., a linear equation). In some implementations, the first subset 34 corresponds to a curved surface such as a cylindrical surface, and the homography function for the first subset 34 is a second degree polynomial or a third degree polynomial. After synthesizing the homography function for the first subset 34, the electronic device 20 generates an inverse of the homography function (e.g., a closed form inverse).

In some implementations, the first warping function 44 includes a first matrix and a second matrix. In some implementations, the first matrix represents an inverse homography function of the first subset 34 and the second matrix represents an inverse of the first matrix. Since pixels in the first subset 34 stay in the same position, there is no need to use an interpolation function for the first subset 34. Forgoing usage of an interpolation function for the first subset 34 ensures that there are no resampling artifacts over the first subset 34. In various implementations, the two matrices are provided to a display pipeline. The display pipeline uses the homography to perform the reprojection.

As shown in FIG. 1B, the first subset 34 represents a planar surface 70. In the example of FIG. 1B, the second subset 36 represents a three-dimensional (3D) cylinder 72. The GPU 26 warps the second subset 36 in accordance with the second warping function 46. As illustrated in FIG. 1B, the GPU 26 warps the 3D cylinder 72. Warping the 3D cylinder 72 in the GPU 26 results in the second result 56. The second result 56 may be provided to the CPU 24 in the form of a partially warped image 58. The CPU 24 determines (e.g., generates or computes) the first warping function 44 for the first subset 34, the CPU 24 provides the first warping function resulting in the first result 54. A display pipeline can combine the first result 54 and the second result 56 to form the warped image 60 that can be displayed on the display. In some implementations, the display pipeline uses the homography of the first subset 34 to combine the first result 54 and the second result 56.

As illustrated in FIG. 1B, the GPU 26 does not warp the planar surface 70. Not warping the planar surface 70 in the GPU 26 reduces the need to use an interpolation function for warping the planar surface 70. Since an interpolation function is not used on the planar surface 70, the planar surface 70 does not include resampling artifacts that adversely impact a quality of the planar surface 70. Since CPU warping tends to be faster than GPU warping, warping the planar surface 70 in the CPU 24 tends to reduce an amount of time required to generate the warped image 60. Since GPU warping tends to generate more heat than CPU warping, warping the planar surface 70 in the CPU 24 tends to reduce an amount of heat generated during the warping of the image 30 thereby increasing a utility of the electronic device 20 by making the electronic device 20 safer to use for a longer time duration.

Figure 2:
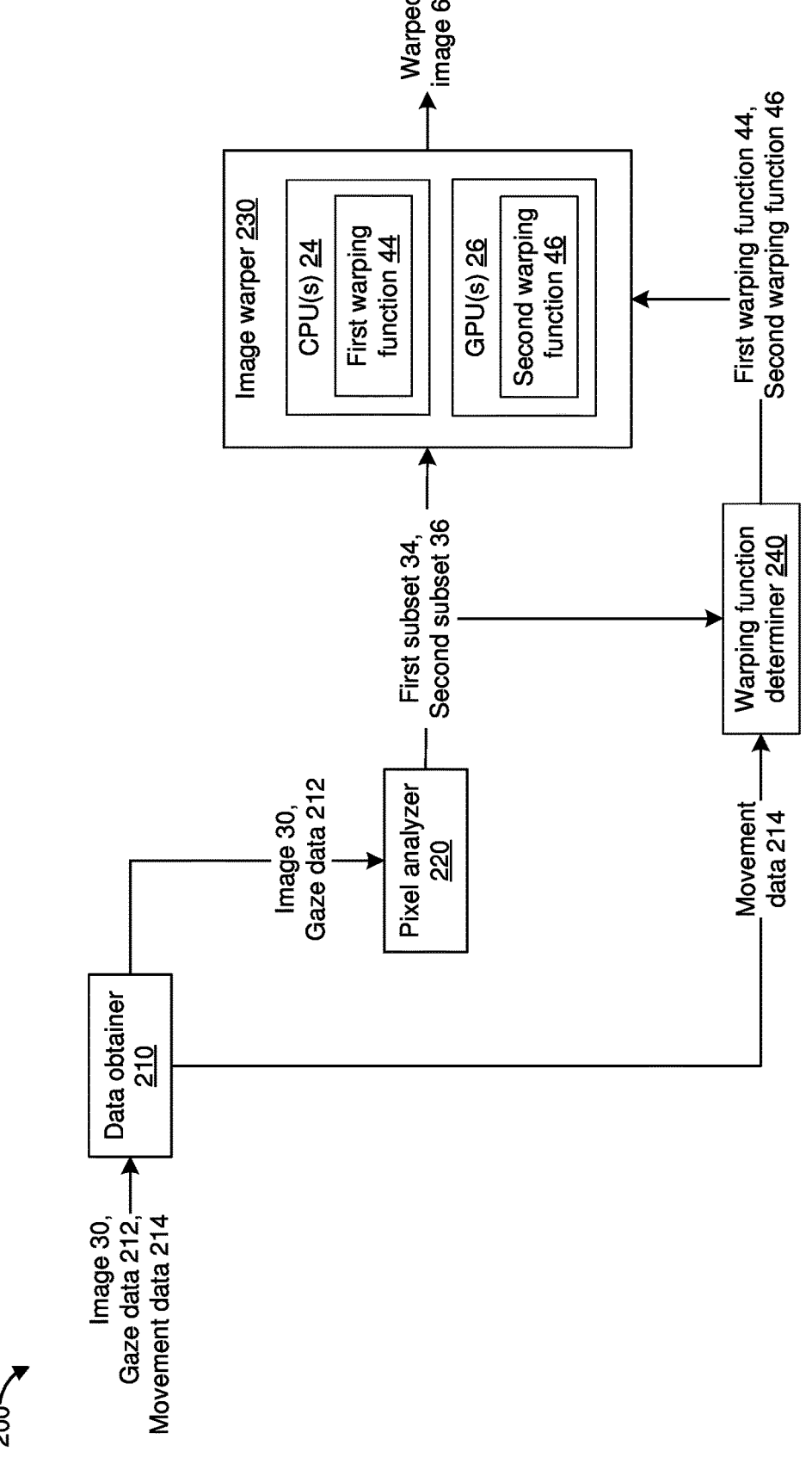
FIG. 2 is a block diagram of a system that warps an image in accordance with some implementations.

FIG. 2 is a block diagram of a system 200 that uses a combination of warping functions to warp an image. In some implementations, the system 200 includes a data obtainer 210, a pixel analyzer 220, an image warper 230 and a warping function determiner 240. In various implementations, the system 200 resides at (e.g., is implemented by) the electronic device 20 shown in FIG. 1A.

In various implementations, the data obtainer 210 obtains the image 30 and gaze data 212. In some implementations, the data obtainer 210 receives the image 30 from a scene-facing camera of the electronic device 20 shown in FIG. 1A. In some implementations, the data obtainer 210 generates the gaze data 212 based on an image captured by a user-facing camera of the electronic device 20. The gaze data 212 indicates a portion of the image 30 where the user 12 is gazing. The data obtainer 210 provides the image 30 and the gaze data 212 to the pixel analyzer 220. In some implementations, the data obtainer 210 obtains movement data 214 that indicates a movement of the electronic device 20. The movement data 214 may indicate a rotation and/or a translation of the electronic device 20. In some implementations, the data obtainer 210 receives the movement data 214 from an IMU of the electronic device 20. In some implementations, the data obtainer 210 determines the movement data 214 based on the image 30. The data obtainer 210 provides the movement data 214 to the warping function determiner 240.

In various implementations, the pixel analyzer 220 identifies the first subset 34 of pixels in the image 30 that corresponds to a portion of the image where the user 12 is gazing. In some implementations, the first subset 34 represents a planar surface (e.g., the planar surface 70 shown in FIG. 1B) that includes pixels identified by the gaze data 212. In some implementations, the pixel analyzer 220 performs a plane fitting operation to fit a plane that encompasses pixels indicated by the gaze data 212. In some implementations, the pixel analyzer 220 expands the plane to include other pixels where the user 12 may not be currently gazing. As such, the first subset 34 may include more pixels than the pixels that are being gazed at. Including more pixels in the first subset 34 reduces a number of pixels that need to be warped by the GPU 26 thereby conserving GPU resources for other operations.

As shown in FIG. 2, the pixel analyzer 220 identifies the second subset 36 of pixels where the user 12 may currently not be gazing. In some implementations, the second subset 36 represents 3D objects that are more suitable for GPU warping and the first subset 34 represents planar surfaces that can more easily be warped by the CPU 24. In some implementations, the second subset 36 includes all pixels of the image 30 that are not in the first subset 34. For example, after identifying the first subset 34, a remainder of the pixels in the image 30 can form the second subset 36. The pixel analyzer 220 provides an indication of the first subset 34 and the second subset 36 to the image warper 230.

In various implementations, the image warper 230 implements the first warping function 44 that is determined (e.g., calculated) by the CPU 24 and applied by the display pipeline, and the second warping function 46 that is performed by the GPU 26. In some implementations, the image warper 230 includes a first set of executable instructions that, when executed by the CPU 24 and the display pipeline, cause the CPU 24 to determine the first warping function 44 for the first subset 34 and the display pipeline to apply the first warping function 44 to the first subset 34. In some implementations, the image warper 230 includes a second set of executable instructions that, when executed by the GPU 26, cause the GPU 26 to perform the second warping function 46 on the second subset 36. In some implementations, the image warper 230 includes a third set of executable instructions that, when executed by the CPU 24 or the display pipeline, cause the CPU 24 or the display pipeline to combine the results on the first warping function 44 and the second warping function to generate the warped image 60.

In some implementations, the warping function determiner 240 generates the first warping function 44 and/or the second warping function 46. In various implementations, the warping function determiner 240 determines the first warping function 44 by constructing a homography function based on the movement data 214 that indicates a movement of the electronic device 20, and the warping function determiner 240 generates an inverse homography function based on the homography function. In some implementations, the warping function determiner 240 generates the inverse homography function by generating a closed form inverse of the homography function. In some implementations, the first warping function 44 includes a first matrix that represents the inverse homography function and a second matrix that is an inverse of the first matrix. In various implementations, the homography function is a polynomial. In some implementations, the first subset 34 represents a 2D plane, and the homography function is a linear equation. In some implementations, the first subset 34 represents a curved surface (e.g., a portion of a 3D cylinder), and the homography function is a second degree polynomial or a third degree polynomial. The warping function determiner 240 provides the first warping function 44 and/or the second warping function 46 to the image warper 230.

FIG. 3 is a flowchart representation of a method 300 for warping an image. In various implementations, the method 300 is performed by a device including one or more processors, a non-transitory memory and an image sensor. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining an image that includes a plurality of pixels. For example, as shown in FIG. 1A, the electronic device 20 obtains the image 30. In some implementations, obtaining the image includes receiving the image from a graphics pipeline. In some implementations, obtaining the image includes retrieving the image from a memory location. In some implementations, the image sensor captures the image in response to a user input that corresponds to a request to capture the image. In some implementations, the image sensor captures the image automatically (e.g., without detecting a user input that corresponds to a request to capture the image).

As represented by block 320, in various implementations, the method 300 includes identifying a first subset of the plurality of pixels that defines a particular geometry that a user of the electronic device is currently focusing on. For example, as shown in FIG. 1A, the electronic device 20 identifies the first subset 34 of the pixels 32 that the user 12 is currently focusing on (e.g., gazing at).

As represented by block 320a, in some implementations, the particular geometry is a two-dimensional (2D) plane and the first subset defines a 2D plane. For example, as shown in FIG. 1B, the first subset 34 represents the planar surface 70. In some implementations, the second subset defines a three-dimensional (3D) object depicted in the image. For example, as shown in FIG. 1B, the second subset 36 represents the 3D cylinder 72.

As represented by block 320b, in some implementations, identifying the first subset includes detecting that a gaze of the user is directed to one or more pixels within the first subset. For example, as described in relation to FIG. 2, in some implementations, the pixel analyzer 220 uses the gaze data 212 to identify the first subset 34.

As represented by block 330, in various implementations, the method 300 includes warping the first subset of the plurality of pixels according to a first warping function that is based on a movement of the electronic device. For example, as shown in FIG. 1A, the electronic device 20 warps the first subset 34 according to the first warping function 44. In some implementations, the method 300 includes causing a CPU to determine (e.g., compute) the first warping function for the first subset and causing a display pipeline to apply the first warping function on the first subset. For example, as shown in FIG. 1A, the CPU 24 determines the first warping function 44 for the first subset 34 and the display pipeline applies the first warping function 44 on the first subset 34.

As represented by block 330a, in some implementations, the method 300 includes determining the first warping function by constructing a homography function based on the movement of the electronic device, and generating an inverse homography function based on the homography function. In some implementations, the inverse homography function is a closed form inverse of the homography function. For example, as discussed in relation to FIG. 2, the warping function determiner 240 determines the first warping function 44 by generating a homography function for the first subset 34 and generating a closed form inverse of the homography function. In some implementations, the closed form inverse of the homography function is represented by a first warp matrix and a second warp matrix is an inverse of the first warp matrix. In some implementations, determining the first warping function includes determining a polynomial equation. In some implementations, the first subset represents a 2D plane and determining the first warping function includes determining a first degree polynomial equation (e.g., a linear equation). In some implementations, the first subset represents a curved plane (e.g., a portion of a cylinder) and determining the first warping function includes determining a second degree polynomial equation or a third degree polynomial equation.

As represented by block 330b, in some implementations, the method 300 includes warping a third subset of the plurality of pixels that defines the particular geometry according to the first warping function. In some implementations, the third subset represents another planar surface and the device performs the first warping operation on the third subset even if the user is not focusing on the third subset of pixels. Since performing the first warping operation is less resource-intensive than performing the second warping operation, performing the first warping operation instead of performing the second warping operation on additional planar surface tends to conserve resources. For example, by warping additional planar surfaces according to a homography function instead of an interpolation-dependent function tends to conserve resources that would be required to perform the interpolation.

As represented by block 340, in some implementations, the method 300 includes warping a second subset of the plurality of pixels, that is different from the first subset, according to a second warping function that is different from the first warping function. For example, as shown in FIG. 1A, the electronic device 20 warps the second subset 36 according to the second warping function 46.

As represented by block 340a, in some implementations, the one or more processors include a central processing unit and a graphics processing unit. For example, as shown in FIG. 1A, the electronic device 20 includes the CPU 24 and the GPU 26. In some implementations, warping the first subset includes performing the first warping function on the first subset in the central processing unit. For example, as shown in FIG. 1A, the CPU 24 determines the first warping function 44 for the first subset 34 and provides values corresponding to the first warping function 44 to the display pipeline so that the display pipeline can apply the first warping function 44 to the first subset 34. In some implementations, warping the second subset includes performing the second warping function on the second subset in the graphics processing unit. For example, as shown in FIG. 1A, the GPU 26 performs the second warping function 46 on the second subset 36.

As represented by block 340b, warping the first subset according to the first warping function requires a first amount of computing resources and warping the second subset according to the second warping function requires a second amount of computing resources that is greater than the first amount of computing resources. For example, as discussed herein, GPU warping tends to be more resource-intensive than CPU warping, for example, because GPU warping requires the use of an interpolation function. For example, referring to FIG. 1A, performing the first warping function 44 on the first subset 34 may be faster than performing the second warping function 46 on the second subset.

As represented by block 340c, in some implementations, warping the second subset includes determining whether or not a warping criterion associated with the second warping function is satisfied. In some implementations, the method 300 includes warping the second subset according to the second warping function in response to determining that the warping criterion associated with the second warping function is satisfied. In some implementations, the method 300 includes forgoing warping the second subset according to the second warping function in response to determining that the warping criterion associated with the second warping function is not satisfied. In some implementations, the warping criterion is satisfied when the movement of the device exceeds a threshold amount of movement, and the warping criterion is not satisfied when the movement of the device is below the threshold amount of movement. In some implementations, the warping criterion is satisfied when a difference between the image and a previous image is greater than a threshold, and the warping criterion is not satisfied when the difference between the image and the previous image is less than the threshold.

As represented by block 340d, in some implementations, respective positions of pixels in the first subset do not change when the first subset is warped according to the first warping function, and respective positions of at least some pixels in the second subset change when the second subset is warped according to the second warping function. As represented by block 340e, in some implementations, the second warping function utilizes an interpolation function and the first warping function does not utilize the interpolation function. As described herein, since the respective positions of pixels in the first subset do not change there is no need to use an interpolation function in the warping of the first subset. However, since the respective positions of at least some of the pixels in the second subset change there may be a need to use an interpolation function in the warping for the second subset. As represented by block 340f, in some implementations, the second subset represents an object that the user is currently not focusing on. The object may be a 2D object or a 3D object. For example, as shown in FIG. 1B, the second subset 36 represents the 3D cylinder 72.

As represented by block 340g, in some implementations, the method 300 includes generating a warped image by combining a first result of the warping of the first subset with a second result of the warping of the second subset. For example, as shown in FIG. 1B, the electronic device 20 combines the first result 54 and the second result 56 to generate the warped image 60. In some implementations, the first warping function includes an inverse homography function that is associated with a corresponding homography function, and combining the first result with the second result includes utilizing the corresponding homography function. In some implementations, the one or more processors include a central processor, a graphics processor and a display pipeline. In some implementations, the central processor performs the first warping function to generate a first result. For example, referring to FIG. 1A, the CPU 24 determines the first warping function 44 for the first subset 34 and the display pipeline applies the first warping function 44 on the first subset 34 to generate the first result 54. In some implementations, the graphics processor performs the second warping function to generate a second result. For example, referring to FIG. 1A, the GPU 26 performs the second warping function 46 on the second subset 36 to generate the second result 56. In some implementations, the display pipeline combines the first result and the second result to generate a warped image. For example, a display pipeline of the electronic device 20 can combine the first result 54 and the second result 56 to generate the warped image 60.

FIG. 4 is a block diagram of a device 400 in accordance with some implementations. In some implementations, the device 400 implements the electronic device 20 shown in FIG. 1A and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more graphics processing units (GPUs) 407, one or more input/output (I/O) devices 408, and one or more communication buses 405 for interconnecting these and various other components. In some implementations, the CPUs 401 are referred to as a central processor and the GPUs 407 are referred to as a graphics processor. In various implementations, the GPUs 407 include an electronic circuit that rapidly manipulates and alters memory to accelerate creation of images in a frame buffer intended for output to a display device. In some implementations, the GPUs 407 include a parallel computing structure that enables the GPUs 407 to perform numerous computations simultaneously. In some implementations, the parallel computing structure of the GPUs 407 makes the GPUs 407 more efficient than the CPUs 401 at performing operations that process large blocks of data in parallel. For example, the parallel computing structure of the GPUs 407 makes the GPUs 407 more efficient at performing the second warping function 46 shown in FIGS. 1A-2.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the pixel analyzer 220, the image warper 230 and the warping function determiner 240. In various implementations, the device 400 performs the method 300 shown in FIG. 3.

In some implementations, the data obtainer 210 includes instructions 210a, and heuristics and metadata 210b for obtaining data (e.g., for obtaining the image 30, the gaze data 212 and the movement data 214 shown in FIG. 1A). In some implementations, the pixel analyzer 220 includes instructions 220a, and heuristics and metadata 220b for analyzing pixels in an image obtained by the data obtainer 210 (e.g., for identifying the first subset 34 and the second subset 36 shown in FIGS. 1A-2). In some implementations, the image warper 230 includes instructions 230a, and heuristics and metadata 230b for warping the image in accordance with a combination of warping functions (e.g., for performing the first warping function 44 and the second warping function 46 shown in FIGS. 1A-2). In some implementations, the warping function determiner 240 includes instructions 240a, heuristics and metadata 240b for determining the warping functions that are used by the image warper 230 (e.g., for generating the first warping function 44 and the second warping function 46 shown in FIGS. 1A-2).

In some implementations, the one or more I/O devices 408 include an input device for obtaining an input. In some implementations, the input device includes a touchscreen (e.g., for detecting tap inputs), an image sensor (e.g., for detecting gesture inputs) and/or a microphone (e.g., for detecting voice inputs). In some implementations, the one or more I/O devices 408 include an environmental sensor for capturing environmental data. In some implementations, the one or more I/O devices 408 include one or more sensors (e.g., the sensors 28 shown in FIG. 1A). In some implementations, the one or more I/O devices 408 include a scene-facing camera. For example, the one or more I/O devices 408 may include a rear-facing camera of a smartphone or a tablet for capturing images or videos of a physical environment. As another example, the one or more I/O devices 408 may include a scene-facing camera of an HMD for capturing images (e.g., a video). In some implementations, the one or more I/O devices 408 include a user-facing camera for capturing images of an eye for gaze detection. For example, the one or more I/O devices 408 may include a front-facing camera of a smartphone or a tablet. As another example, the one or more I/O devices 408 may include an eye tracking camera of an HMD.

In some implementations, the one or more I/O devices 408 include a display. In various implementations, the one or more I/O devices 408 include a video pass-through display which displays at least a portion of a physical environment surrounding the device 400 as an image captured by a camera (e.g., the display 22 shown in FIG. 1A may be a video pass-through display). In various implementations, the one or more I/O devices 408 include an optical see-through display which is at least partially transparent and passes light emitted by or reflected off the physical environment (e.g., the display 22 shown in FIG. 1A may be an optical see-through display).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
   at an electronic device including one or more processors, a non-transitory memory, and an image sensor:
   obtaining an image that includes a plurality of pixels;
   identifying a first subset of the plurality of pixels that defines a particular geometry that a user of the electronic device is currently focusing on, wherein the particular geometry is a two-dimensional (2D) plane;
   warping the first subset of the plurality of pixels according to a first warping function that is based on a movement of the electronic device, wherein the first warping function is used to warp pixels defining the 2D plane; and
   warping a second subset of the plurality of pixels, that is different from the first subset, according to a second warping function that is different from the first warping function, wherein the second subset defines a geometry different from the 2D plane, and wherein the second warping function is used to warp pixels defining the geometry different from the 2D plane.

2. The method of claim 1, wherein:
   the one or more processors include a central processing unit and a graphics processing unit;
   warping the first subset comprises determining the first warping function for the first subset in the central processing unit and applying the first warping function on the first subset in a display pipeline; and
   warping the second subset comprises determining the second warping function for the second subset in the graphics processing unit and applying the second warping function on the second subset in the graphics processing unit.

3. The method of claim 1, wherein warping the first subset according to the first warping function requires a first amount of computing resources and warping the second subset according to the second warping function requires a second amount of computing resources that is greater than the first amount of computing resources.

4. The method of claim 1, wherein warping the second subset comprises:
   determining whether or not a warping criterion associated with the second warping function is satisfied;
   warping the second subset according to the second warping function in response to determining that the warping criterion associated with the second warping function is satisfied; and
   forgo warping the second subset according to the second warping function in response to determining that the warping criterion associated with the second warping function is not satisfied.

5. The method of claim 4, wherein the warping criterion is satisfied when the movement of the electronic device exceeds a threshold amount of movement; and
   the warping criterion is not satisfied when the movement of the electronic device is below the threshold amount of movement.

6. The method of claim 4, wherein the warping criterion is satisfied when a difference between the image and a previous image is greater than a threshold; and
   the warping criterion is not satisfied when the difference between the image and the previous image is less than the threshold.

7. The method of claim 1, further comprising:
   determining the first warping function by constructing a homography function based on the movement of the electronic device; and
   generating an inverse homography function based on the homography function.

8. The method of claim 7, wherein the inverse homography function is a closed form inverse of the homography function.

9. The method of claim 7, wherein the inverse homography function is represented by a first warp matrix and a second warp matrix is an inverse of the first warp matrix.

10. The method of claim 7, wherein the homography function is a polynomial.

11. The method of claim 7, wherein the homography function is a linear equation.

12. The method of claim 1, wherein respective positions of pixels in the first subset do not change when the first subset is warped according to the first warping function; and
   wherein respective positions of at least some pixels in the second subset change when the second subset is warped according to the second warping function.

13. The method of claim 1, wherein the second warping function utilizes an interpolation function and the first warping function does not utilize the interpolation function.

14. The method of claim 1, wherein warping the first subset according to the first warping function does not result in sampling artifacts at locations corresponding to the first subset; and

wherein warping the second subset according to the second warping function results in a sampling artifact at least one location corresponding to the second subset.

15. The method of claim 1, further comprising:
warping a third subset of the plurality of pixels that defines the particular geometry according to the first warping function.

16. The method of claim 1, wherein the second subset defines a three-dimensional (3D) object depicted in the image.

17. The method of claim 1, wherein the second subset represents an object that the user is currently not focusing on.

18. An electronic device comprising:
one or more processors;
an image sensor;
a non-transitory memory; and
one or more programs stored in the non-transitory memory, which, when executed by the one or more processors, cause the device to:
obtain an image that includes a plurality of pixels;
identify a first subset of the plurality of pixels that defines a particular geometry that a user of the electronic device is currently focusing on, wherein the particular geometry is a two-dimensional (2D) plane;
warp the first subset of the plurality of pixels according to a first warping function that is based on a movement of the electronic device, wherein the first warping function is used to warp pixels defining the 2D plane; and

warp a second subset of the plurality of pixels, that is different from the first subset, according to a second warping function that is different from the first warping function, wherein the second subset defines a geometry different from the 2D plane, and wherein the second warping function is used to warp pixels defining the geometry different from the 2D plane.

19. The device of claim 18, wherein the second subset defines a three-dimensional (3D) object depicted in the image, and wherein the geometry different from the 2D plane is warped using the second warping function.

20. A non-transitory memory storing one or more programs, which, when executed by one or more processors of an electronic device with an image sensor, cause the electronic device to:
obtain an image that includes a plurality of pixels;
identify a first subset of the plurality of pixels that defines a particular geometry that a user of the electronic device is currently focusing on, wherein the particular geometry is a two-dimensional (2D) plane;
warp the first subset of the plurality of pixels according to a first warping function that is based on a movement of the electronic device, wherein the first warping function is used to warp pixels defining the 2D plane; and
warp a second subset of the plurality of pixels, that is different from the first subset, according to a second warping function that is different from the first warping function, wherein the second subset defines a geometry different from the 2D plane, and wherein the second warping function is used to warp pixels defining the geometry different from the 2D plane.

* * * * *